INVENTOR
M. V. MATHEWS
BY Harry C. Hart
ATTORNEY

INVENTOR
M. V. MATHEWS
BY Harry C. Hart
ATTORNEY

INVENTOR
M. V. MATHEWS
BY Harry C. Hart
ATTORNEY

3,023,277
REDUCTION OF SAMPLING RATE IN PULSE CODE TRANSMISSION

Max V. Mathews, New Providence, N.J., assignor to Bell Telephone Laboratories, Incorporated, New York, N.Y., a corporation of New York Filed Sept. 19, 1957, Ser. No. 684,993
12 Claims. (Cl. 179—15)

This invention relates to the transmission of messages by pulse code techniques. Its general object is to reduce the number of message wave samples required to be transmitted in order that data shall be available at a receiver station in sufficient numbers to serve as a basis for the reconstruction of the signal wave.

In the transmission of a message wave by pulse code techniques, the wave to be transmitted is sampled at successive instants, the samples are encoded, and the coded samples are transmitted in succession to a receiver station where they are decoded and utilized to reconstruct the original wave. In the usual case the sampling operation is completely systematic and is carried out with perfect regularity at a fixed rate, known as the Nyquist rate, equal to twice the frequency of the highest frequency wave component which it is required to preserve. At the receiver station, it is a simple matter to reproduce the original wave simply by passing the sequence of samples through a suitably proportioned low-pass filter. The simplicity with which such reproduction is accomplished is a consequence of the well known sampling theorem as expounded, for example, by Oliver, Pierce and Shannon in "The Philosophy of PCM" published in the Proceedings of the Institute of Radio Engineers for November 1948, vol. 36, page 1324.

In systems of a related class, the sampling operation is completely unsystematic and is carried out erratically so that the signals occur in a random fashion. For example, the sampler may be controlled by a "noise" source. The time interval after which each such random sampling pulse follows its predecessor is, by and large, sufficiently short to meet the fundamental requirement of the sampling theorem; i.e., it approximates a Nyquist interval. The advantage offered by the erratic sampling program lies in the elastic fashion with which a number of such systems may be multiplexed together.

Systems of both these classes offer many advantages. For example, the code signals which they transmit are invulnerable to degradation by a noise gathered in the course of transmission. But these advantages are purchased at the price of bandwidth which, for any preassigned code, is directly proportional to the sampling rate. Indeed, the bandwidth required for transmission of a signal in this manner is so great that it is generally accepted that such systems are not economical unless they be generously multiplexed.

In accordance with the present invention the sampling operation is neither regular nor erratic. Rather, it is closely correlated with the characteristics of the wave to be sampled. In the case of a speech wave, for example, a sample is taken at each and every peak or extreme of the wave, positive or negative, upgoing or downcoming, and at no other instants.

Because the rate at which such peaks succeed each other in time varies widely during the progress of the wave, the sampling rate varies equally widely, from a highest value which may exceed that employed in the regular sampling systems to a lowest value some twenty to fifty times as small, the average rate, for ordinary telephone speech, being about 1,000 samples per second. By the use of an ordinary time scale buffer the samples, derived at the widely varying rate, may be transmitted over a transmission channel at the fixed average rate. As compared with a conventional system in which 8,000 samples are taken per second at all times in order to preserve the 4,000 cycles per second component of the signal, this results in a bandwidth saving in the ratio of eight to one. After transmission and reception at the receiver station the original time scale may be restored through the agency of another buffer.

The choice of the peaks or extremes of the signaling wave as the sampling instants offers a number of advantages. First, the peaks of the wave itself occur at the same instant as do the zero or null values of its first derivative. Hence they are readily recognizable by simple apparatus. Second, once a set of such peak-marking samples has been transmitted to a receiver station and reproduced there, a number of alternatives are open to the designer by which he may reconstruct from them the original wave with more or less accuracy, depending on the choice. Thus, if the samples be merely passed in succession through a low-pass filter of conventional construction and proportioned as is customary in a regular sampling system, the high frequency portions of the wave are accurately reproduced while the portions which are of lower frequency are at least approximated by smooth wave portions. Other simple apparatus arrangements make possible closer reproductions of the original wave from the peak-defining samples here contemplated than is possible with any other set of samples that recur at a varying rate.

In accordance with a further feature of the invention an almost perfect reproduction of each wave portion which interconnects the two members of each successive pair of samples becomes possible. When, as here contemplated, a sample is taken at every peak and no sample is taken at any other instant the portion of the original wave which interconnects two successive samples has the following properties: (*a*) it passes through both samples; (*b*) its rate of change is zero at both samples; and (*c*) it progresses smoothly from one sample to the other. It thus closely resembles a cosine wave for the first half, or the second half, as the case may be, of a full period. In accordance with this feature of the invention, therefore, an interpolation wave generator is included as a component of the receiver apparatus, and it generates a wave portion for interpolation between the two members of each pair of samples. The interpolation wave generator may take various forms, the requirements being only that the wave which it generates shall satisfy the three conditions enumerated above. One such interpolation wave, which is preferred for the sake of simplicity of the apparatus required for its generation, is a cubic equation of the general form $$y=3x^2-2x^3$$

To generate any such interpolation wave it is necessary that the receiver be furnished with information, for each pair of samples, not only as to their amplitudes but as to their locations on the time scale. This information, which is of course readily available at the transmitter station, may be transmitted, along with the sample amplitude information and preferably in the form of pulse code, to the receiver station. To take advantage of the bandwidth reduction features of the invention a time scale buffer may be employed to distribute this information evenly in time on the transmission line and another like buffer may be employed at the receiver station to restore the original time scale. Thereupon the information as to the amplitudes of the two members of each sample pair and as to the time interval which separates them is supplied to the interpolation wave generator of which the output is a substantial replica of the original wave.

The invention will be fully apprehended from the following detailed description of a preferred illustrative embodiment thereof, taken in connection with the appended drawings, in which.

Figure 1:
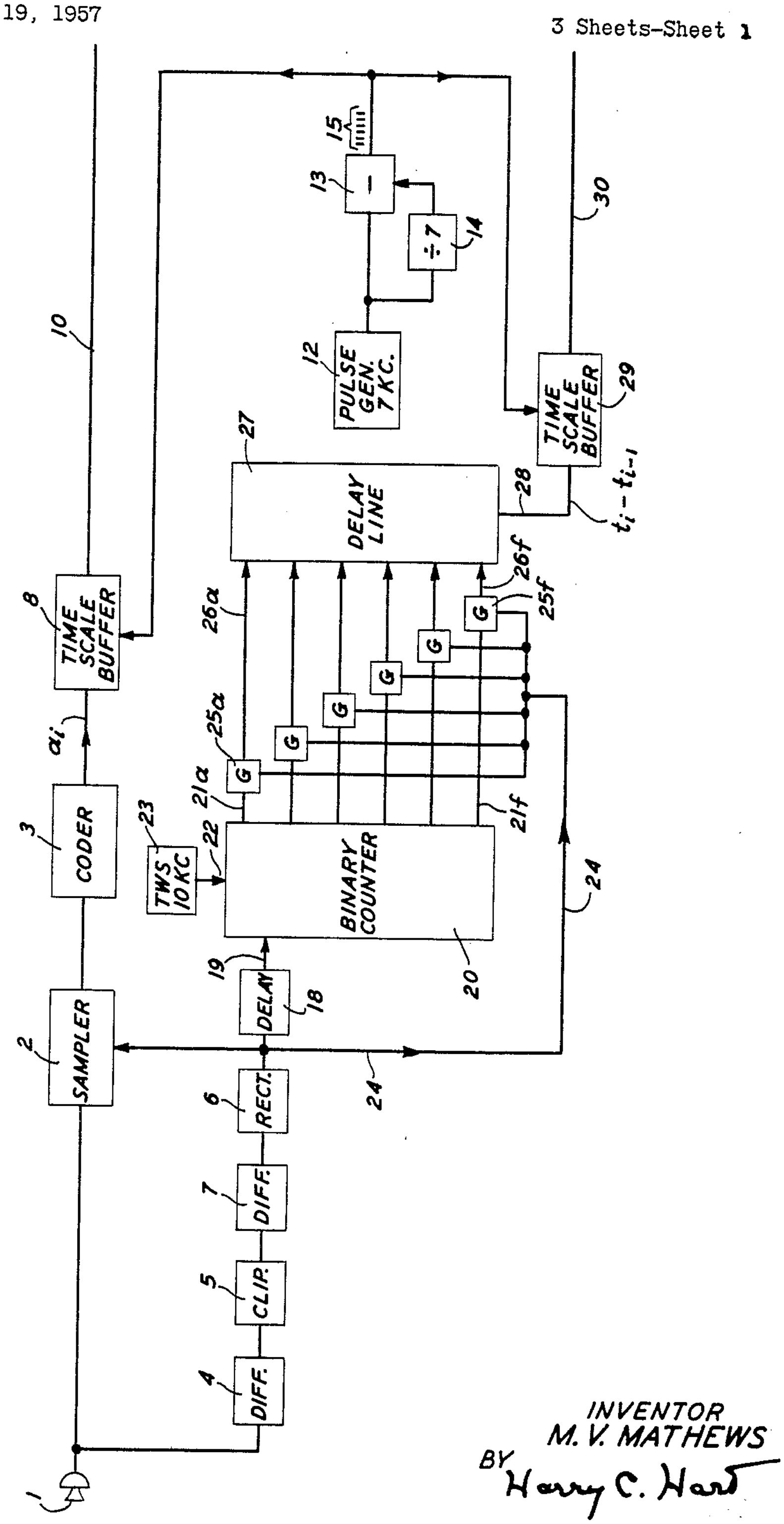
FIG. 1 is a block schematic diagram showing transmitter station apparatus embodying the invention.

In the interests of simplicity, the circuit diagrams to be discussed are presented, for the most part, in block-schematic form; with single-line paths which direct the flow of energy and apparatus components which process it. This rule is departed from in a few individual instances where the inclusion of electric input terminals and output terminals appears to add to the clarity of the exposition. It is to be understood that, in practice, each single-line energy path will normally be actualized with two electric conductors, one of which may in many cases be connected to ground.

Referring now to the drawings, a message to be transmitted, for example a voice wave originating in a microplone 1 is applied to the input terminal of a sampling gate 2 which delivers on its output terminal a brief sample of the amplitude of the wave, each time its control terminal is energized. Each of these samples is applied in turn, as it occurs, to a coder 3 which encodes it according to a preassigned code, for example 6-digit pulse permutation code. The sampler and the coder may be of any desired type; e.g., that described by L. A. Meacham and E. Peterson in the Bell System Technical Journal for January, 1948, vol. 27, page 1.

Figure 3A:
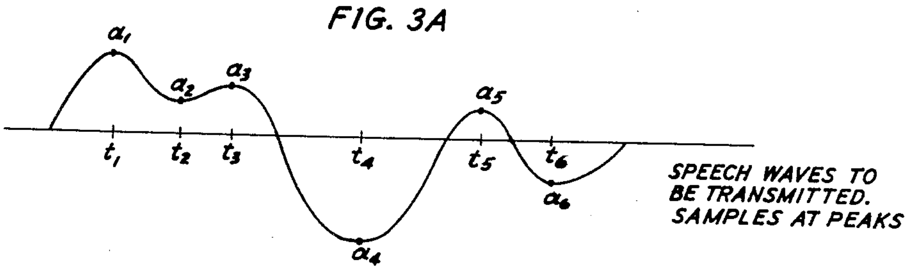
FIG. 3A shows a portion of a speech wave of which samples are taken at each peak or extreme.

In accordance with the invention the sampling gate 2 is actuated, and hence a wave sample is taken, at the instant of occurrence of each peak or extreme of the wave and at no other instants. This situation is depicted in FIG. 3A, wherein $a_i$ denotes the amplitude of the $i$th sample and higher subscript numbers denote later samples. The peaks of the wave itself occur at the same instants as do the zero or null values of its first derivative. Hence the necessary enabling pulses may be derived from a branch circuit to which the wave from the microphone 1 is applied and including a differentiator 4, a clipper 5 and a rectifier 6 connected in tandem in the order named. The peak-marking enabling pulses thus produced may be further sharpened by inclusion of a second differentiator 7 between the clipper and the rectifier.

Because the enabling pulses are applied to the sampler irregularly, the pulse code groups appear at the output terminal of the coder 3 irregularly. If desired they may be transmitted without further processing by way of a channel 10, to a receiver station. To secure the maximum advantage, however, especially from the standpoint of bandwith reduction, it is preferred to convert the irregular sequence of code pulse groups to a regular one prior to transmission. To this end a time scale buffer 8 is included in tandem between the coder 3 and the transmission channel 10. Apparatus components of this kind are well known and are described, for example, by A. L. Leiner, in "Buffering Between Input-Output and the Computer," published in March 1953 by the American Institute of Electrical Engineers at page 22 of a Report of a joint AIEE-IRE-ACM Computer Conference, with the title "Review of Input and Output Equipment Used in Computing Systems." Apparatus having the same performance and utilizing an electrostatic beam storage tube as its central component is described by A. J. Lephakis in "An Electrostatic Tube Storage System" published in the Proceedings of the Institute of Radio Engineers for 1951, vol. 39, page 1413.

The buffer 8 is preferably actuated to deliver outgoing code pulse groups to the transmission channel in regular succession and at the average rate at which peaks follow one another in a speech wave, e.g., at about 1,000 groups per second. The normal buffer requires a control pulse individual to each output pulse of each group. Hence a train of six control pulses is required for each output code pulse group. In order that the individual groups may be readily distinguished from each other a guard space of duration equal to a single pulse interval may be provided between successive groups.

Groups of pulses to control the time scale buffer may readily be generated in various ways. A simple and convenient arrangement comprises a pulse generator 12 proportioned to deliver a regular unbroken train of pulses at a repetition rate of about 7 kilocycles per second. Its output terminal is connected to one input terminal of a subtractor 13. The pulse generator output is also applied to a divider 14, e.g., a single trip multivibrator, proportioned to divide the pulse rate by seven. The output of this divider is connected to the second input point of the subtractor 13. With this arrangement, the pulses of the generator 12 pass through the subtractor 13 to the control terminal of the buffer 8 until, as indicated at 15, six such pulses have passed through, but the seventh is blocked by cancellation in the subtractor 13 because, at and only at the seventh pulse interval are pulses applied to both input terminals of the subtractor 13.

For the development of sample time information, the peak-marking pulses derived in the fashion described above are also applied through a delay device 18, proportioned to introduce a delay or retardation of the order of one-tenth millisecond, to the reset terminal 19 of a binary counter 20. This binary counter may be of conventional construction and of a number of stages selected to afford a degree of resolution in the measurement of intersample intervals such as quality considerations may dictate. Presently available data indicate that 6-digit resolution, affording sixty-four recognizably different discrete values, provides sufficient accuracy and accords well with 6-digit resolution, furnishing sixty-four different discrete values for the sample amplitudes. Thus the binary counter 20 includes six successive circuit stages and is provided with six output terminals 21$a$ through 21$f$. Its input terminal 22 is supplied with a wave of relatively high frequency, e.g., 10 kilocycles per second, by a timing wave source 23. Immediately after the application to its reset terminal 19 of a peak-marking pulse through the delay device 18, the counter 20 proceeds to count the successive cycles of the input wave. At each moment its count appears as a permutation of voltage conditions on its six output leads 21 in well known fashion. It continues to count until it is reset to zero by application of the next peak-marking pulse. At this moment its count represents the number of 10 kilocycle pulses which it received between the prior sample and the present one– i.e., it measures this intersample time interval $t_i-t_{i-1}$. With ordinary speech, successive peaks are rarely spaced apart on the time scale by as much as 6.4 milliseconds. Hence the counter rarely reaches the count of sixty-four. On those rare occasions in which it does reach the count of sixty-four, it makes a small error which reappears at the receiver as a brief spurt of noise. This is of no serious consequence.

Immediately prior to the resetting of the counter 22 each peak-marking pulse is applied by way of a conductor 24 to the control terminals of all of a group of six gates 25$a$ through 25$f$. These several gates are connected respectively between the several output conductors 21 of the counter 20 and the correspondingly numbered taps 26*a* through 26*f* of a delay line 27. Thus the last count of the counter 20, represented by the voltage conditions on its output conductors 21 immediately prior to the resetting operation, is applied as a group of input pulses to the several taps 26 of the delay line 27 and to all of them simultaneously. The delay line 27 converts them from simultaneous conditions on separate input points to a sequence of conditions on a single output terminal 28, in well known fashion. On this conductor 28 the pulses are arranged in 6-digit serial permutation code and may if desired be transmitted over a channel 30 without further processing. Because, however, of the irregular character of the sampling operation the successive pulse groups appear on the conductor 28 with the same irregularity. For economy of bandwidth of the transmission channel 30 they are preferably transmitted in regular fashion. They may be regularized on the time scale by a buffer 29 identical with the time scale buffer described above and controlled by the auxiliary 6-pulse generator 12—14.

Figure 2:
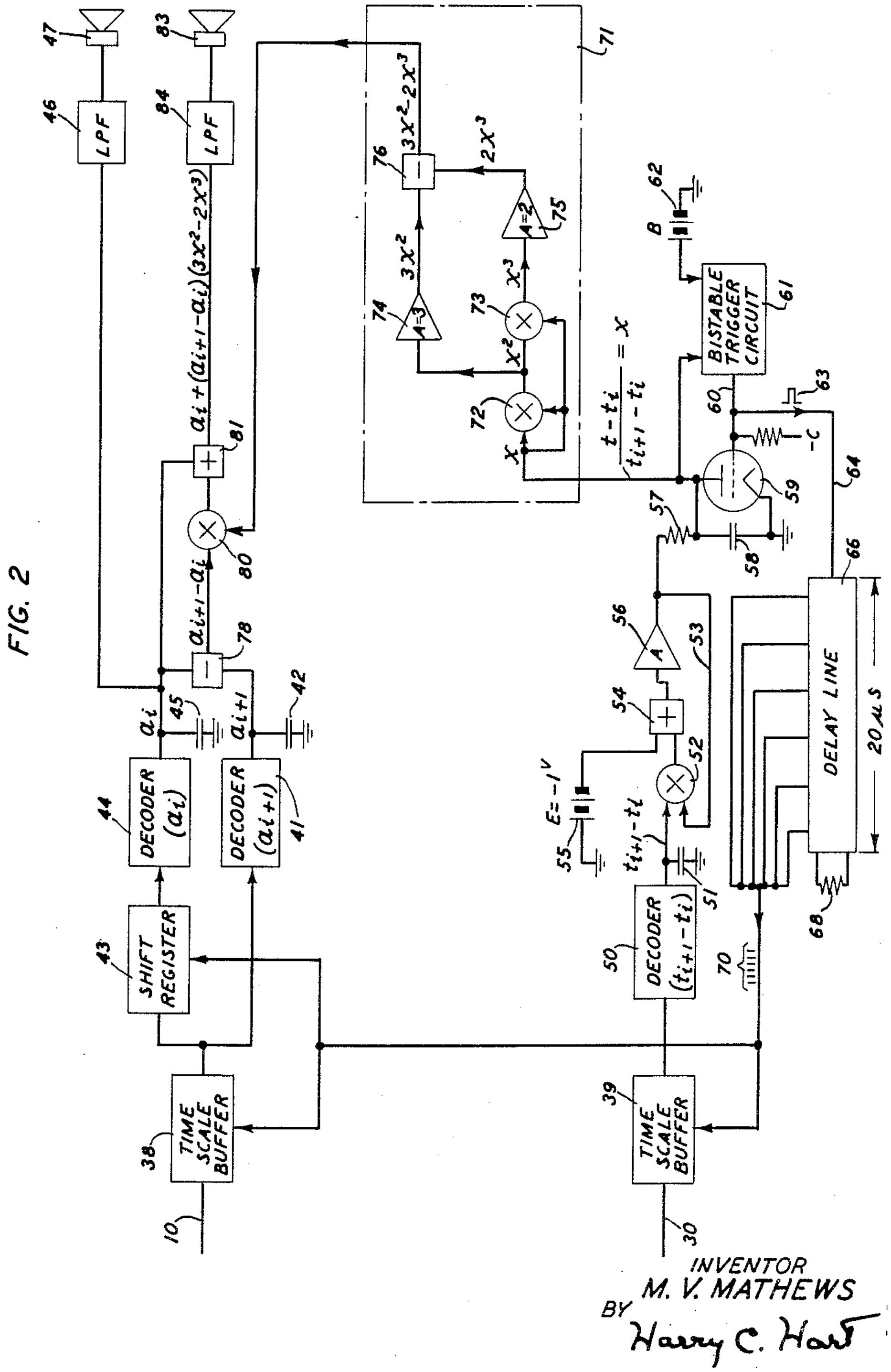
FIG. 2 is a block schematic diagram showing receiver station apparatus embodying the invention.

The codes sample amplitude information, after transmission over the first channel 10 to a receiver station shown in FIG. 2, is first applied to a time scale buffer 38. Similarly the coded intersample interval information, after transmission to the receiver station over a second channel 30 is first applied to a second time scale buffer 39. These time scale buffers may be identical in construction with the buffers 8, 29 described above in connection with FIG. 1. Their operations, however, are inverse to the operations of the former time scale buffers, in that they receive information-carrying pulse groups in regular sequence and deliver them irregularly, thus restoring, at the output terminals of the buffers, the original time scale which obtained at the input terminals of the first pair of buffers. This result is achieved by the application to the control terminals of the receiver buffers 38, 39 of enabling pulses at all proper instants, generated in the fashion to be described below.

Assuming, for the present, that such control apparatus operates as required, the output of the amplitude channel time scale buffer 38 thus consists of a sequence of code pulse groups, irregularly spaced in time, each of which represents the amplitude of a single wave sample. These code pulse groups are applied, as they appear, to a decoder 41 which restores the information contained in each such group from its digital form to its original analog form; i.e., it converts the code pulse group into an amplitude sample. This decoder may be of any desired type, e.g., that described by L. A. Meacham and E. Peterson in the Bell System Technical Journal for January 1948, vol. 27, page 1. Each output pulse of the decoder is preferably stretched in time until the occurrence of the next ouput pulse, as by a conventional amplitude-holding circuit, here shown illustratively as a condenser 42 of which one terminal is connected to the decoder output terminal and the other is connected to ground. The same code pulse groups appearing at the output terminal of the time scale buffer 38 are also applied to a shift register 43 which may be of conventional construction as described, for example, in "Pulse and Digital Circuits" by J. Millman and H. Taub (McGraw-Hill, 1956). This shift register 43 is under control of the same actuating pulses as are the time scale buffers 38, 39. Hence each time a code pulse group is delivered by the time scale buffer 38 to the input terminal of the shift register 43 the preceding code pulse group is retrieved at the output terminal of the shift register. The irregular series of code pulse groups thus retrieved from the shift register 43 are applied to a second decoder 44 which may be identical with the former decoder and which, like the former one, converts each pulse group applied to its input point to an amplitude sample. These amplitude samples are stretched, like those of the former decoder, by a holding circuit 45.

Thus, because of the delay of one intersample interval introduced by the shift register 43, the outputs of the two decoders 41, 44, at instant $t_1$, represent the amplitudes of two successive samples, the output of the upper decoder 44 representing the most recent sample and the output of the lower one 41 representing the next sample to come. This time relation is indicated in conventional terminology by the legend $a_1$ to designate the output of the upper decoder 44, the most recent sample, and the legend $a_{1+1}$ to designate the output of the lower decoder 41, the sample to follow next.

In case time scale modification be not desired and the buffers 8, 29, 38, 39 accordingly be omitted, and in case the generation of the interpolation function to be described is considered unnecessary the output of either of these two decoders 41, 44, consisting as it does of a sequence of amplitude samples stretched on the time scale, may be applied to a reproducer 45 by way of a low-pass filter 46, suitably proportioned. The result is an excellent replica of the higher frequency portions of the input speech wave and a less good, though still tolerable, replica of the lower frequency portions of the speech wave.

The sample trains from the two decoders 41, 44 differ only in that one is delayed with respect to the other by a single intersample interval.

It is preferred, however, to arrange that the quality of the reproduced speech be independent of frequency; and to this end the invention provides for the interpolation of a smooth wave portion between each sample and the next one. The interpolation is carried out in the following fashion.

The output of the lower time scale buffer 39 consists of an irregular series of code pulse groups each of which represents the interval between each sample and the next one. These pulse groups are applied in succession to a decoder 50 which converts them to analog form; that is to say, each output pulse of the decoder 50 has a magnitude proportional to the interval in question; i.e., to the interval $t_{1+1}-t_1$. Each of these output pulses is preferably stretched in time, as by a holding circuit 51.

The quantity $$\frac{1}{t_{1+1}-t_1}$$

needed in the generation of the interpolation function, is next generated by a reciprocating circuit. While the latter may be of any desired construction a convenient one follows the principle that by the inclusion in a feedback loop of an apparatus component which by itself carries out a specified operation, the loop as a whole carries out the inverse operation. Thus the output of the decoder 50 is fed to one input point of a multiplier 52 to whose other input point a feedback conductor 53 is connected. The multiplier output point is connected to one input point of an adder 54 to whose other input point a potential source 55 of $-1$ volt is connected. The output of the adder 54 is applied to an amplifier 56 of gain factor A, preferably large. The output terminal of the amplifier 56 is connected by way of the feedback path 53 to the second input terminal of the multiplier 52.

That this circuit carries out the reciprocating operation may readily be seen from the following elementary analysis, following a treatment which is now conventional for feedback circuits generally.

If E be the voltage at the output terminal of the amplifier 56, A be its gain factor and $e$ be the quantity applied from the decoder 50 to the first input terminal of the multiplier 52 then the output of the multiplier 52 is the product of its two inputs, namely E and $e$. To this is added the quantity $-1$ from the source 55 by the adder 54 and the sum is applied as the input to the amplifier 56. The amplifier in effect multiplies this sum by the gain factor A and produces, as the product, the output voltage E.

These operations may be concisely expressed by the equation $$E=A(Ee-1) \qquad (1)$$

of which the solution is $$E=\frac{1}{e-\frac{1}{A}} \quad (2)$$

With a large magnitude for the gain factor A, the second term of the denominator may be disregarded so that Equation 2 reduces approximately to $$E=\frac{1}{e} \quad (3)$$

As stated above, the signal $e$ applied to the first input point of the multiplier 52 is the same as the output signal of the decoder 50, as stretched by the holding circuit 51. That is to say, $$e=k(t_{i+1}-t_i) \quad (4)$$

where $k$ is a constant of proportionality. Hence combining (4) with (3), $$E=\frac{1}{k(t_{i+1}-t_i)} \quad (5)$$

Or, the output E of the amplifier 56 is proportional, during each intersample interval, to the reciprocal of the length of that intersample interval.

The reciprocal of the intersample interval thus derived is next utilized to develop a normalized time variable for use in the generation of the required interpolation wave. This is simply accomplished in the following way. The output E of the amplifier 56 is applied to a series combination of a resistor 57 and a condenser 58 in such a fashion that the condenser is charged by the voltage E through the resistor and at a rate dependent on the magnitude of E and on the product of the resistance by the capacitance. In order that the charging rate shall be sensibly constant over the periods of interest the capacitance of the condenser 58 should be appropriately large. If desired, a supplementary compensating network of the type known as a "boot strap" circuit may be employed still further to linearize the charging rate.

The conduction path of a voltage-controlled switch of any variety, here shown for illustration as a triode 59, is connected directly across the terminals of the condenser 58. The grid of this triode, normally biased to cutoff, is connected to the output terminal 60 of a trigger circuit 61 which may, for example, be of the type described by A. B. Schmidt in the Journal of Scientific Instruments for 1938, vol. 15, page 24. This trigger circuit 61 is provided with two input points one of which is connected to one terminal of the condenser 58 while the other is connected to a bias battery 62 of voltage B. The behavior of the trigger circuit 61 is that, as the charging of the condenser 58 proceeds, the trigger circuit remains quiescent until the condenser voltage, of which the momentary magnitude is V, has reached the magnitude of B volts whereupon, the voltage V being applied to the first input point of the trigger circuit being in excess of the voltage B applied to its second input point, the trigger circuit 61 switches abruptly from one state to the other state and applies a positive voltage to its output terminal 60 and hence to grid of the triode 59. The triode 59 then short-circuits the condenser 58, bringing its voltage abrutly to zero and thus returning the trigger circuit 61 to its first conduction state. As a result, a brief pulse 63 is delivered by way of a conductor 64 each time the condenser 58 is discharged, and this event marks the conclusion of the charging interval.

It is the consequence of this sequence of events that, during each charging interval the voltage across the condenser 58 increases linearly with time as measured from the most recent instant of discharge $t_i$, from its initial zero value to its final value B, and at the rate $$\frac{dV}{dt}=\frac{1}{kRC(t_{i+1}-t_i)} \quad (6)$$

Integration of (6) from the most recent discharge instant $t_i$ to the present time gives $$V(t)=\frac{t-t_i}{kRC(t_{i+1}-t_i)} \quad (7)$$

At the conclusion of the charging interval, when $t$ has reached the value $t_{i+1}$, this voltage reaches the preassigned magnitude $V_1=B$. Hence, at this concluding instant, $$V_1=B=\frac{t_{i+1}-t_i}{kRC(t_{i+1}-t_i)} \quad (8)$$

From (8), $$BkRC=1 \quad (9)$$

Substituting (9) in (7) and dividing both sides by B, we have $$\frac{V}{B}=\frac{t-t_i}{t_{i+1}-t_i} \quad (10)$$

It is evidently a simple fatter to proportion the constants $k$, R, C, B in such a way as to satisfy Equation 9. The constant B, the only one which appears explicitly in Equation 10, serves there merely as a scale factor. To avoid unnecessary complication of the following development, it will be assumed equal to unity, in which case, also, $$kRC=1 \quad (9a)$$

and $$V=\frac{t-t_i}{t_{i+1}-t_i} \quad (10a)$$

If a threshold voltage other than unity be for any reason desired, the corresponding changes of the development to follow, and of the circuit to be described, will be apparent to the reader.

It will be recalled that the trigger circuit 61 trips, the condenser 58 is discharged, and an output pulse 63 is delivered when the condenser voltage V reaches the tripping voltage B, i.e., when the ratio $$\frac{V}{B}$$

reaches the magnitude 1 volt. Equation 10 shows that this condition is reached when the charging time has attained quality with the latest completed intersample interval. Hence the output pulse occurs at the current instant $t_{i+1}$ to mark the endpoint of the current interval and the starting point of the next one. It may therefore be utilized to control the actuation of the time scale buffers 38, 39 and of the shift register 43, thus to read out of the buffers the data which define the next sample, namely the amplitude $a_{i+2}$ and the time interval $t_{i+2}-t_{i+1}$, and to read each code pulse group out of the shift register at the moment the next one is written into it. In each of these cases a group of six pulses is to be read out of the apparatus, so that the control pulses are to be delivered in groups of six. To convert the output pulse of the trigger circuit 61 into a six-pulse train, each output pulse 63 may be applied over the conductor 64 to the input terminal of a delay line 66 having an appropriate number of lateral output taps, in this case six, and terminated as by a resistive load 68 for no reflection. This combination converts each input pulse into a sequence of six output pulses 70 in well known fashion. If no overall delay is required in addition to the conversion, and such is usually the case, the first output point of the delay line 66 shown for illustrative purposes as a lateral tap, may in fact be connected directly to the input point of the delay line.

Inasmuch as the function of the two time scale buffers 38, 39 is to restore the original speech sample time scale, the pulses of the code groups which constitute the outputs of these buffers are preferably substantially compressed on the time scale, thus to allow for a temporary rapid succession of coded speech samples without overlapping or interference between them. This compression is readily secured simply by the proportionment of the delay line 66 to give a desired total retardation. A delay of about 3.4 microseconds between successive taps, and hence an overall delay for all six taps of about 20 microseconds is recommended.

The voltage V of Equation 10*a* is applied to an interpolation wave generator whose function it is to generate a wave segment which, continuously throughout the intersample interval represents, exactly or approximately, that portion of the original voice wave which interconnects two successive amplitude samples. Any such wave portion may be represented generally as $$W=S\left[\frac{t-t_i}{t_{i+1}-t_i}\right] \quad (11)$$

or, substituting the variable $x$ as an abbreviation for the argument; that is, putting $$X=\frac{t-t_i}{t_{i+1}-t_i} \quad (12)$$

there results $$W=S(x) \quad (13)$$

Waves following various mathematical forms can be constructed to satisfy the requirement that they shall coincide with the two samples which bound each interval, have zero derivatives at each end, and be continuous between. One such mathematical form, which closely approximates a half cosine wave, is $$F=a_i+(a_{i+1}-a_i)(3x^2-2x^3) \quad (14)$$

That this forms satisfies the foregoing conditions may readily be seen as follows. First, bearing in mind that $x$ is an abbreviation for the argument in Equation 11 as is apparent that at the beginning of any interval, when $t$ is equal to $t_i$, $x$ is equal to zero and hence that Equation 14 reduces to its first term, $a_i$. Second, at the end of the interval when $t$ is equal to $t_{i+1}$, the argument in (11) is equal to unity, $x$, $x^2$ and $x^3$ are all equal to unity, the second factor of the second term of (14) is equal to unity, and Equation 14 reduces to $a_{i+1}$.

Third, the derivative of (14) is evidently $$F'=(a_{i+1}-a_i)(6x-6x^2) \quad (15)$$

This expression vanishes both for $x=0$ and for $x=1$. Thus the derivative has the value of zero at both endpoints of the interval. Hence the rate of change of the interpolation wave is zero at each endpoint of the intersample interval.

Fourth, as may readily be determined by setting the first derivative of Equation 15 equal to zero, the curve of Equation 14 has its greatest slope for $$X=\frac{1}{2}$$

that is to say, half way between the beginning of the intersample time interval given by Equation 12 and the end of it. For this value of the independent variable, too, the amplitude of the curve of Equation 14 lies midway between the amplitude of the initial sample $a_i$ and the terminal sample $a_{i+1}$. It may also readily be determined that both the curve of Equation 14 and its slope as given by Equation 15 vary smoothly from each end of the curve to the other.

Figure 4A:
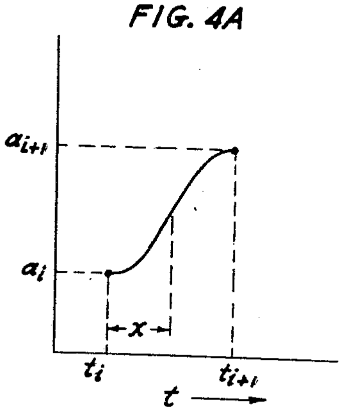
FIG. 4A shows a wave segment generated and proportioned for interpolation between an earlier smaller sample and a later larger sample.
Figure 4B:
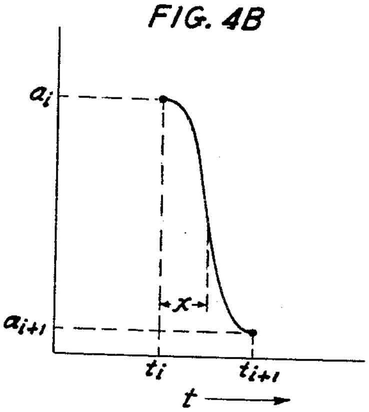
FIG. 4B shows a wave segment similarly interpolated between an earlier larger sample and a later smaller sample.

A graph of Equation 14 is shown in FIG. 4A for the case in which the later sample is greater than the earlier one, and in FIG. 4B for the opposite case in which the reverse is true.

FIG. 2 shows a computing network 71 for generating successive wave segments of the form given by Equation 14. The quantity $$x=\frac{t-t_i}{t_{i+1}-t_i} \quad (12)$$

is applied to its input point and, within it, to both input points of a first multiplier 72. The output of this first multiplier is hence $x^2$. This quantity is applied to the first input point of a second multiplier 73 while the original input quantity is applied to its second input point. Hence the output of the second multiplier is $x^3$. An amplifier 74 of gain factor $A=3$ suffices to convert $x^2$ into $3x^2$, and a second amplifier 75 of gain factor $A=2$ suffices to convert $x^3$ into $2x^3$. The second of these quantities is subtracted from the first by a subtractor of conventional construction to deliver, at the output terminal of the wave generator 71, the quantity $3x^2-2x^3$.

This wave segment is now interpolated between the adjacent samples, where it belongs, in the following fashion. The output of the upper amplitude decoder 44 is subtracted from that of the lower decoder 41 by a conventional subtractor 78 to give the quantity $$a_{i+1}-a_i$$

This is applied to one input point of a multiplier 80 while the output of the wave generator 71 is applied to its other input point. The product, of the form given by the second term of Equation 14, is added in an adder 81 to the output $a_i$ of the decoder 44. Hence after all of these operations the output of the adder 81 has the form of both terms of Equation 14 together, wherein as before, $x$ is merely an abbreviation for the time, following the $i$th sample and preceding the $(i+1)$th sample, divided by the interval between these two samples.

Figure 3B:
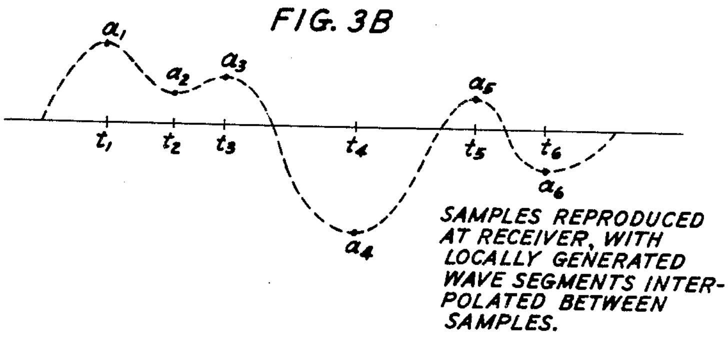
FIG. 3B is a diagram showing the reconstruction at a remote point of the samples of FIG. 3A and the interpolation of smooth wave portions between them.

The wave given by Equation 14 thus truly represents the original wave between any particular sample and the next one. Such a wave segment is shown, interpolated between the two members of each pair of samples, in FIG. 3B. Since the subscript $i$ may stand for any sample of the entire train the final wave, given by Equation 14 for successive sample pairs, duplicates the entire original speech wave, from start to finish, as shown in FIG. 3B. It may therefore be applied to a reproducer 83 without further processing. To exclude extraneous components due to switching transients and the like, it may be preferred to interpose a low-pass filter 84 of conventional construction and proportionment.

In the ordinary pulse code communication system in which the sampling is carried out regularly, the information transmission rate is limited by the available bandwidth of the transmission channel and accordingly it is conventional to carry out the sampling operation at the Nyquist rate for that channel. Specifically, when the bandwidth of the available channel is 4,000 cycles per second the Nyquist sampling rate is 8,000 samples per second, and this is sufficient to carry the information contained in a component of the voice wave whose frequency is 4,000 cycles per second, but no higher. To sample the voice wave at the transmitter station at $a_i$ a substantially higher rate presents no technical problem but, in the usual system, represents a waste of effort. In the present system, to the contrary, transmission takes place at the average sample recurrence rate of about 1,000 cycles per second. Hence, on occasions when the speech wave contains components of frequencies substantially higher than 4,000 cycles per second, e.g., 5,000 or 6,000 cycles per second, the sampling operation may advantageously be carried out at the transmitter station at a correspondingly higher rate than the usual 8,000 samples per second, namely 10,000 or 12,000 samples per second. So too, at the receiver station the reconstructed samples may on such occasions be characterized by a similar close spacing. In other words the channel capacity no longer limits the instantaneous sampling rate and a system such as that here described therefore permits the transmission, on occasions when such is required, of the information contained in those higher frequency components of the speech wave which are blocked by the transmission medium in a conventional regular sampling system.

Various modifications and extensions of the illustrative embodiments discussed above will suggest themselves to the reader.

What is claimed is:

1. In combination with a source of a message wave characterized by an irregular succession of peaks, apparatus which comprises means at a transmitter station for deriving successive single pulses at, and only at, each instant at which a peak of said message wave occurs, each of said pulses having an amplitude equal to that of said peak of said message wave, a transmission medium extending from said transmitter station to a receiver station, means for transmitting information representative of the amplitudes of the successive pulse amplitude samples over said medium to said receiver station, means for also transmitting information representative of the instants of occurrence of the successive pulse amplitude samples to said receiver station, and means at said receiver station for reconstructing said signal wave from said transmitted information.

2. In combination with apparatus as defined in claim 1, means at said transmitter station for accepting wave samples in the irregular sequence in which they are derived and at varying rates, and for delivering said wave samples to said transmission medium in regular sequence and at a fixed average rate.

3. In combination with apparatus as defined in claim 2, means at said receiver station for accepting received signal samples at a regular, fixed rate, and for delivering said samples to said wave reconstructing means as an irregular sequence and at the varying rate at which said samples were derived.

4. In combination with a source of a message wave characterized by an irregular succession of peaks, apparatus for deriving successive single pulses at, and only at, each instant at which a peak of said message wave occurs, each of said pulses having an amplitude equal to that of said peak of said message wave, means for transmitting to a receiver station information representative of the amplitudes and the instants of occurrence of the successive pulse amplitude samples, means at said receiver station for reproducing the successive pulse amplitude samples from said transmitted information, and means under control of said transmitted information, for generating a smooth wave that interconnects each reproduced pulse amplitude sample with the following reproduced pulse amplitude sample, and of which the rate of change is zero at both of said pulse amplitude samples.

5. In combination with a source of a message wave characterized by an irregular succession of peaks, apparatus for deriving successive single pulses at, and only at, each instant at which a peak of said message wave occurs, each of said pulses having an amplitude equal to that of said peak of said message wave, means for transmitting to a receiver station information of a first kind representative of the amplitudes of the successive pulse amplitude samples to a receiver station, means for also transmitting to said receiver station information of a second kind representative of the instants of occurrence of the successive pulse amplitude samples, means at said receiver station for reproducing the successive pulse amplitude samples from said information, and means for generating, from said information, a smooth wave that coincides with both members of each pair of said pulse amplitude samples and of which the rate of change is zero at both of said members.

6. In combination with a source of a signal wave characterized by an irregular succession of peak values, transmission apparatus which comprises means for deriving from said signal wave pulses, each of whose amplitudes is equal to that of each such peak as a first indication of the amplitude of each such peak, means for deriving a second indication of the instant of occurrence of each such peak, means for transmitting said first and second indications to a receiver station, means at said receiver station controlled by said transmitted indications for reconstructing the successive wave peaks, and means for generating, from said transmitted indications, a smooth wave that interconnects each reconstructed peak with the following reconstructed peak and of which the rate of change is zero at both of said peaks.

7. In combination with a source of a message wave, apparatus for deriving a sample of said wave at each of its peaks which comprises a sampling gate having an input terminal, an output terminal and a control terminal, a first path extending from said source to said input terminal, a utilization device connected to said output terminal, and a branch path interconnecting said source with said control terminal said branch path and including a differentiator, a clipper and a rectifier connected together in the order named.

8. Apparatus for constructing a replica of an original wave from a sequence of peak-defining samples of said wave, which comprises means for generating a voltage representing, for each sample, the time interval to the next sample, means for reciprocating said voltage, means for integrating the reciprocal from the instant of the most recent sample to the present time to form an argument, means for terminating said integration at the instant of said next sample, means for generating a wave that is a preassigned continuous function of said argument, said preassigned function having zero slope at both ends of said interval, zero value at the commencement of said interval and the value unity at the conclusion of said interval, means for generating a second voltage representative of the amplitude difference between the most recent sample and the next sample, means for multiplying said second voltage by said generated wave to form a product, means for generating a third voltage that is representative of the amplitude of said most recent sample, and means for adding said third voltage to said product.

9. The method of transmitting a message wave characterized by an irregular succession of peaks, which comprises the following steps: developing, for each such peak, a first signal representative of the amplitude of said peak and a second signal representative of its instant of occurrence, whereby said signals occur in pairs and irregularly in time, storing each of said signal pairs, regularly transmitting to a receiver station the successive signal pairs at a signalling rate substantially less than the maximum rate of occurrence of the peaks of the message wave, and, at said receiver station, storing signal pairs incoming in regular sequence, recovering each of said second signals as stored, utilizing each of said recovered second signals to control the time of recovery of the paired one of said first signals as stored, reproducing said recovered first signals in irregular succession, and utilizing each of said recovered second signals to interpolate a smooth wave segment between each of said first signals and the next.

10. In combination with a source of a message wave of which the coordinates are time and amplitude, said message wave being characterized by a succession of amplitude peaks that are irregularly spaced on the time scale, apparatus for deriving successive single pulses at, and only at, each instant on the time scale at which a peak of said message wave occurs, each of said pulses having an amplitude equal to that of said peak of said message wave, whereby the sequence of said pulse amplitude samples is characterized by the same spacing irregularity as is the succession of said message wave amplitude peaks, and means for reconstituting an artificial message wave from said irregular pulse sample sequence.

11. In combination with a source of a message wave of which the coordinates are time and amplitude, said message wave being characterized by a succession of amplitude peaks that are irregularly spaced on the time scale, apparatus for deriving successive single pulses at, and only at, each instant on the time scale at which a peak of said message wave occurs, each of said pulses having an amplitude equal to that of said peak of said message wave, whereby the sequence of said pulse amplitude samples is characterized by the same spacing irregularity as is the succession of said message wave amplitude peaks, means for transmitting said irregular pulse amplitude sample sequence to a receiver station and, at said receiver station, means for reconstituting an artificial message wave from the same irregular pulse sample sequence.

12. In combination with a source of a message wave of which the coordinates are time and amplitude, said message wave being characterized by a succession of amplitude peaks that are irregularly spaced on the time scale, apparatus for deriving successive single pulses at, and only at, each instant on the time scale at which a peak of said message wave occurs, each of said pulses having an amplitude equal to that of said peak of said message wave, whereby the sequence of said pulse amplitude samples is characterized by the same spacing irregularity as is the succession of said message wave amplitude peaks, means for transmitting to a receiver station the amplitudes and the instants of occurrence of the successive pulse amplitude samples, and means at said receiver station for reconstituting an artificial message wave from said irregular pulse sample sequence.

References Cited in the file of this patent

UNITED STATES PATENTS

| | | |
|---|---|---|
| 2,098,956 | Dudley | Nov. 16, 1937 |
| 2,448,718 | Koulicovitch | Sept. 7, 1948 |
| 2,676,202 | Filipowsky | Apr. 20, 1954 |
| 2,726,283 | Di Toro | Dec. 6, 1955 |
| 2,784,256 | Cherry | Mar. 5, 1957 |
| 2,890,285 | Bogert et al. | June 9, 1959 |